US011270028B1

(12) United States Patent
Chen et al.

(10) Patent No.: US 11,270,028 B1
(45) Date of Patent: Mar. 8, 2022

(54) OBTAINING JOINTLY TRAINED MODEL BASED ON PRIVACY PROTECTION

(71) Applicant: ALIPAY (HANGZHOU) INFORMATION TECHNOLOGY CO., LTD., Zhejiang (CN)

(72) Inventors: Chaochao Chen, Hangzhou (CN); Jun Zhou, Hangzhou (CN); Li Wang, Hangzhou (CN); Yingting Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/354,982

(22) Filed: Jun. 22, 2021

(30) Foreign Application Priority Data

Sep. 16, 2020 (CN) .......................... 202010974956.7

(51) Int. Cl.
*G06F 21/62* (2013.01)
*H04L 9/00* (2022.01)
*G06F 21/60* (2013.01)

(52) U.S. Cl.
CPC ........ *G06F 21/6263* (2013.01); *G06F 21/602* (2013.01); *H04L 9/008* (2013.01)

(58) Field of Classification Search
CPC .... G06F 21/6245; G06F 21/602; G06F 21/62; G06F 21/6254; G06F 21/6263;
(Continued)

(56) References Cited

U.S. PATENT DOCUMENTS

2017/0132528 A1\* 5/2017 Aslan ..................... G06N 20/00
2020/0242466 A1\* 7/2020 Mohassel ............ G06F 21/6254
(Continued)

FOREIGN PATENT DOCUMENTS

| CN | 109002861 | 12/2018 |
| CN | 110633805 | 12/2019 |
| CN | 111241570 | 6/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Meng Li
(74) *Attorney, Agent, or Firm* — Fish & Richardson P.C.

(57) ABSTRACT

One or more embodiments of the present specification relate to a method and system for obtaining a jointly trained model based on privacy protection. An example method includes jointly training a first model, by a first device and with a second device, the first device and the second device each holding respective training data that includes first training data with a sample label, and second training data without the sample label. Jointly training the first model includes privately obtaining the first training data, and performing joint model training using the first training data. The second training data is input to the trained first model to obtain a predicted label for the second training data. Jointly training a second model includes privately obtaining labeled training data, and performing joint model training using the first training data, the second training data, and the labeled training data.

20 Claims, 5 Drawing Sheets

(58) Field of Classification Search
CPC ...... G06N 3/0454; G06N 3/084; G06N 20/00; G06N 20/20; G06N 3/0472; G06N 3/0481; G06N 3/08; G06N 3/088; G06N 3/063; G06N 5/003; H04L 9/008; H04L 2209/46; H04L 9/085; H04L 9/302; G06K 9/6256; G06K 9/6271; G06K 9/628; G06K 9/6259
See application file for complete search history.

(56) References Cited

U.S. PATENT DOCUMENTS

2020/0243167 A1\* 7/2020 Will .................. G06N 5/003
2021/0303725 A1\* 9/2021 Hartman .............. G06N 3/08

OTHER PUBLICATIONS

Nakamoto, "Bitcoin: A Peer-to-Peer Electronic Cash System," www.bitcoin.org, 2005, 9 pages.

\* cited by examiner

OBTAINING JOINTLY TRAINED MODEL BASED ON PRIVACY PROTECTION

CROSS-REFERENCE TO RELATED APPLICATIONS

This application claims priority to Chinese Patent Application No. 202010974956.7, filed on Sep. 16, 2020, which is hereby incorporated by reference in its entirety.

TECHNICAL FIELD

One or more embodiments of the present specification relate to multi-party data cooperation, and in particular, to methods and systems for obtaining a jointly trained model based on privacy protection.

BACKGROUND

In the fields of data analysis, data mining, economic forecasting, etc., machine learning models can be used to analyze and discover potential data value. Because data held by a single data owner may be incomplete, it is difficult to describe a target accurately. In order to obtain more accurate model prediction results, joint model training based on data cooperation of multiple data owners is widely used. However, in a multi-party data cooperation process, not all samples have label information. In the fields of medical care, finance, etc., a large number of experts are needed to manually mark label information, and thus the cost is high.

Therefore, methods are proposed for obtaining a jointly trained model based on privacy protection to train an effective jointly trained model using a small number of labeled samples and a large number of unlabeled samples.

SUMMARY

An aspect of the embodiments of the present specification provides a method for obtaining a jointly trained model based on privacy protection, where the method is implemented by a first end-user device in participants, the participants include the first end-user device and a second end-user device, which hold horizontally or vertically segmented training data respectively, the training data includes first training data with a sample label and second training data without a sample label, and the method includes the following: a first model is jointly trained with the second end-user device in the participants through privacy protection based on the first training data with a sample label; the second training data without a sample label is input to the trained first model through privacy protection to obtain predicted labels of the second training data; and joint model training is performed with the second end-user device to obtain a second model through privacy protection based on the first training data with a sample label and the second training data with the predicted label.

Another aspect of the embodiments of the present specification provides a system for obtaining a jointly trained model based on privacy protection, where the system is implemented by a first end-user device in participants, the participants include the first end-user device and a second end-user device, which hold horizontally or vertically segmented training data, the training data includes first training data with a sample label and second training data without a sample label, and the system includes: a first model acquisition module, configured to jointly train a first model with the second end-user device through privacy protection based on the first training data with a sample label; a predicted label acquisition module, configured to input the second training data without a sample label to the trained first model through privacy protection to obtain a predicted label of the second training data; and a second model acquisition module, configured to perform joint model training with the second end-user device to obtain a second model through privacy protection based on the first training data with a sample label and the second training data with the predicted label.

Another aspect of the embodiments of the present specification provides an apparatus for obtaining a jointly trained model based on privacy protection, where the apparatus includes a processor and a memory, the memory is configured to store an instruction, and the processor is configured to execute the instruction to implement the operations for obtaining a jointly trained model based on privacy protection.

BRIEF DESCRIPTION OF DRAWINGS

Further descriptions are made in the present specification with example embodiments, and these example embodiments are described in detail with reference to the accompanying drawings. These embodiments are nonrestrictive, and the same numbers in these embodiments represent the same structures. In the accompanying drawings.

DESCRIPTION OF EMBODIMENTS

Figure 1:
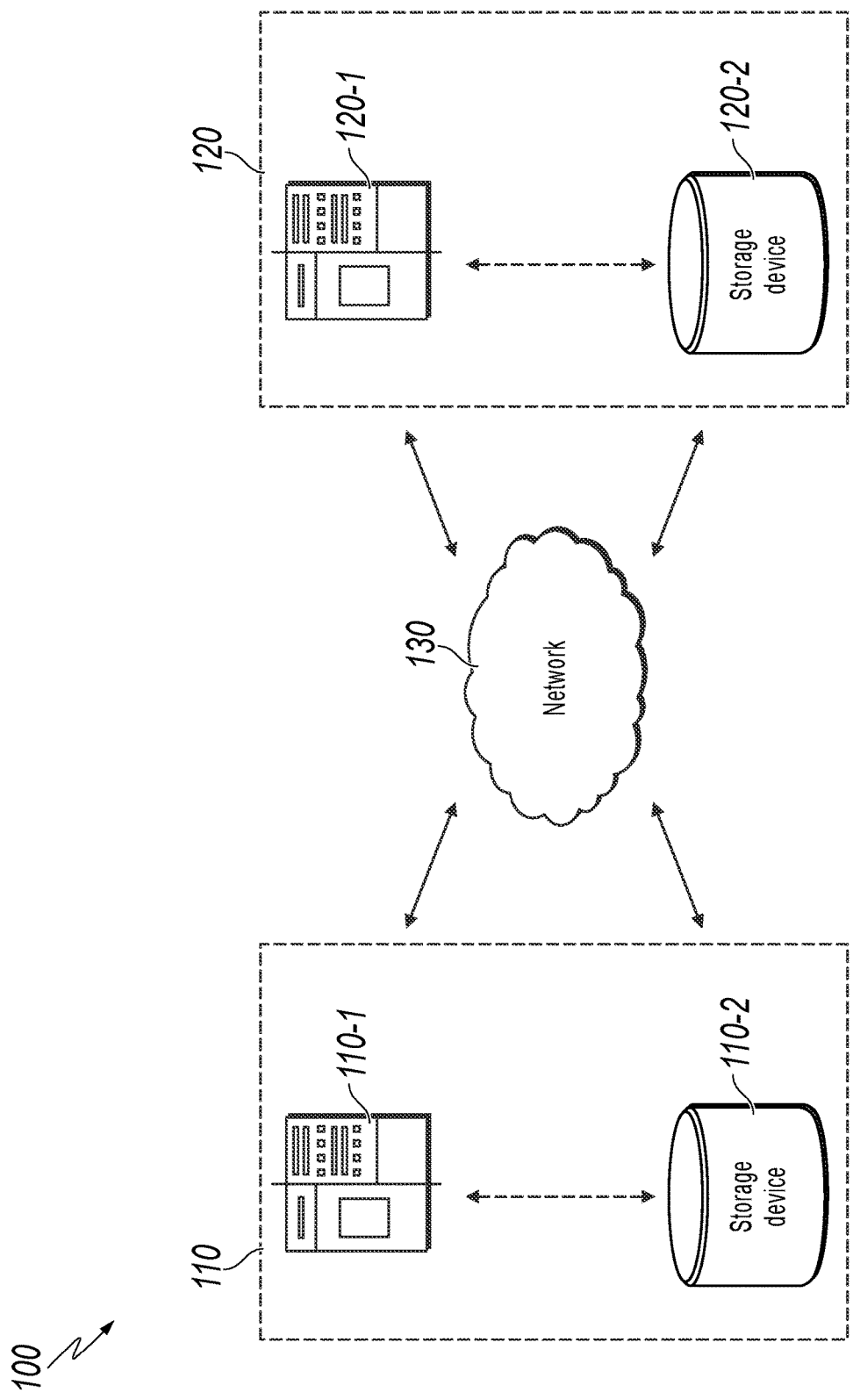
FIG. 1 is a diagram illustrating an example application of a system for obtaining a jointly trained model based on privacy protection, according to some embodiments of the present specification.

In order to describe the technical solutions of the embodiments of the present specification more clearly, the accompanying drawings used in descriptions about the embodiments will be simply introduced below. It is clear that the accompanying drawings in the following descriptions are merely some examples or embodiments of the present specification. A person of ordinary skill in the art can further implement other similar applications of the present specification based on these accompanying drawings without creative efforts. Unless clearly shown in language or otherwise stated, the same reference numerals in the figures represent the same structures or operations.

It should be understood that "system", "apparatus", "unit" and/or "module" used in the present specification are or is described for distinguishing between different components, elements, parts, portions or assemblies of different levels. However, the terms can be replaced with other expressions if the expressions can achieve the same purposes.

As described in the present specification and the claims, terms "a/an", "one", "a type of", "the", etc., do not refer in particular to a singular form and can also include a plural form unless exceptional cases are clearly indicated in the context. Generally, terms "include" and "contain" only indicate inclusion of steps and elements that are clearly identified, these steps and elements are enumerated non-exclusively, and the method or the device may further include other steps or elements.

The flowcharts are used in the present specification to describe operations executed by systems according to the embodiments of the present specification. It should be understood that the previous or subsequent operations are not always executed accurately in sequence. Instead, each step can be performed in a reverse sequence or at the same time. In addition, other operations can also be added to these processes, or one or more operations can be removed from these processes.

There are massive information data in various industries such as economy, culture, education, medical care and public management, data processing such as data analysis, data mining and trend prediction on the massive information data is applied to more and more scenarios. Multiple data owners can obtain better data processing results by data cooperation. For example, more accurate model parameters can be obtained by joint training with data of multiple parties.

In some embodiments, a system for obtaining a jointly trained model based on privacy protection can be used to train a machine learning model by cooperation of multiple parties for the parties to use on the premise of ensuring the data security of each party. In such case, multiple data owners have their own data, and they want to use the data of each other for unified modeling (e.g., a linear regression model and a logistic regression model), but they don't want their own data (particularly training data) to be leaked. For example, Internet depository institution A holds a batch of user data, government bank B holds another batch of user data, and a relatively good machine learning model can be obtained by training based on a training sample set determined by the user data of A and B. Both A and B are willing to participate in model training through the user data of each other, but for some reasons, A and B do not want their own user data information to be leaked or at least do not want their own user data information to be known by each other.

Through the system for obtaining a jointly trained model based on privacy protection, a shared machine learning model can be obtained by joint training with data of multiple parties without leaking training data of the multiple parties to achieve win-win cooperation.

In some embodiments, in joint training based on data of multiple parties, to prevent leakage of training data, a garbled circuit or secret sharing can be used. When a feature dimension is relatively large, the operation efficiency of the garbled circuit or secret sharing is not high. Moreover, secret sharing requires multiple data parties to participate in operation using their own data at the same time. In some embodiments, homomorphic encryption can also be performed on the training data of each party, and then the training data of each party is involved for the operation for model training in an encrypted state. Homomorphic encryption only supports product operation and/or sum operation, and during the use, corresponding operational equations need to be correspondingly converted as needed. When the feature dimension is relatively large, the operation efficiency of the homomorphic encryption solution is high.

In multi-party joint modeling scenario, not all training data includes corresponding sample labels. In some cases (e.g., medical diagnosis), a large number of experts are needed to manually mark label samples, and thus the cost is high. It is significant to train an effective model using a small number of labeled samples and a large number of unlabeled samples. In some embodiments, this problem can be solved in a multi-party privacy protection self-learning way.

FIG. 1 is a diagram illustrating an example application of a system for obtaining a jointly trained model based on privacy protection, according to some embodiments of the present specification.

In some embodiments, the system 100 for obtaining a jointly trained model based on privacy protection includes a first end-user device 110, a second end-user device 120 and a network 130. The first end-user device 110 can include a processing device 110-1 and a storage device 110-2. The second end-user device 120 includes a processing device 120-1 and a storage device 120-2. In some embodiments, data held by the first end-user device and the second end-user device relates to user related information in different fields. For example, the data held by the two end-user devices can include amounts deposited in bank accounts by users every year, or can include information about the gender, age, income, address, etc., of user groups involved in a certain investment and financial management project or a certain insurance brand. It is worthwhile to note that, merely as an example, there are two end-user devices in FIG. 1, and in other embodiments, a third-party end-user device, a fourth-party end-user device, etc., can also be included.

The first end-user device 110 and the second end-user device 120 can be devices with data acquisition, storage and/or sending functions, can be different devices that are physically isolated, or can be two processes that needs privacy protection to be performed on their data in the same server. In some embodiments, the first end-user device 110 and the second end-user device 120 can include but not limited to a mobile device, a tablet, a notebook computer, a desktop computer, etc., or any combination of the mobile device, the tablet, the notebook computer, the desktop computer, etc. In some embodiments, the first end-user device 110 and the second end-user device 120 can send related data to each other or receive related data from each other. For example, the first end-user device 110 can send the first end-user's own encrypted first training data to the second end-user device 120. The first end-user device 110 can also receive encrypted second training data from the second end-user device 120.

The processing devices 110-1 and 120-1 of the first end-user device and the second end-user device can process data and/or instructions. The processing device 110-1 and 120-1 can encrypt data, and can also execute related algorithms and/or instructions. For example, the processing device 110-1 of the first end-user device 110 can encrypt the first training data, and can also participate in joint model training using a first encrypted accumulated value. For another example, the processing device 120-1 of the second end-user device 120 can encrypt the second training data, and can also calculate a second encrypted accumulated value based on a related algorithm instruction.

The storage devices 110-2 and 120-2 of the first end-user device and the second end-user device can store the data and/or instructions executed and used by the corresponding processing devices 110-1 and 120-1, and the processing devices 110-1 and 120-1 can execute or use the data and/or instructions to implement example methods in the present specification. The storage devices 110-2 and 120-2 can be configured to store the first training data and the second training data respectively, and can also store related instructions for instructing the first end-user device and the second end-user device to execute operations. The storage devices 110-2 and 120-2 can also respectively store data processed by the processing devices 110-1 and 120-1. For example, the storage devices 110-2 and 120-2 can also respectively store a model parameter (e.g., a first parameter matrix) of a feature corresponding to the first training data and a model parameter (e.g., a second parameter matrix) of a feature corresponding to the second training data. In some embodiments, the storage device 110-2 and the storage device 120-2 can be one storage device, and the first end-user device and the second end-user device can only obtain their own stored data from the storage device. In some embodiments, the storage device can include a high-capacity memory, a mobile memory, a volatile read-write memory, a read-only memory (ROM), etc., or any combination of the high-capacity memory, the mobile memory, the volatile read-write memory, the read-only memory (ROM), etc.

The network 130 can promote exchange of at least one of information and data. In some embodiments, one or more components of the system 100 (for example, the first end-user device 110 (the processing device 110-1 and the storage device 110-2) and the second end-user device 120 (the processing device 120-1 and the storage device 120-2)) that perform model training based on the training data can send information and/or data to other components in the system 100 through the network 130. For example, the processing device 120-1 of the second end-user device 120 can obtain the first training data from the first end-user device 110 through the network 130. For another example, the processing device 110-1 of the first end-user device 110 can obtain the first training data from the storage device 110-2 of the first end-user device 110 through the network 130. In some embodiments, the network 130 can be wired or wireless networks in any form, or any combination of the wired or wireless networks in any form.

The system in one or more embodiments of the present specification can include a data receiving module and a plurality of data processing modules.

In some embodiments, the first end-user device and the second end-user device can be transposed. Taking execution of the first end-user device as an example, in a system taking the first end-user device as an execution body, the system can include a first model acquisition module, a predicted label acquisition module, and a second model acquisition module. All the previously described modules are executed in a computing system introduced in an application scenario, each module includes an own instruction, the instruction can be stored in a storage medium, and the instruction can be executed in a processor. Different modules can be in the same device, or can be in different devices. The modules can transmit data with one another through program interfaces, the network, etc., and can read data from the storage device or write data into the storage device.

The first model acquisition module is configured to jointly train a first model with the second end-user device through privacy protection based on the first training data with a sample label.

The predicted label acquisition module is configured to input the second training data without a sample label to the trained first model through privacy protection to obtain a predicted label of the second training data.

The second model acquisition module is configured to perform joint model training with the second end-user device to obtain a second model through privacy protection based on the first training data with a sample label and the second training data with the predicted label. The second model acquisition module can be used to implement joint training based on samples including sample labels and samples including predicted labels to obtain a jointly trained second model together.

In some embodiments, the system further includes a second model iterative updating module. The second model iterative updating module is configured to update the predicted label based on a second model calculated by a previous round of iteration; perform joint model training with the second end-user device to update the second model through privacy protection based on the first training data with a sample label and the second training data with the updated predicted label; and based on the updated second model, determine to perform a next round of iteration or determine the second model. The second model iterative updating model is used to update the second model by multiple rounds of iterations, so that a second model with better performance can be obtained.

In some embodiments, the second model includes a first parameter matrix and a second parameter matrix, and the first parameter matrix and the second parameter matrix are stored in the first end-user device and the second end-user device respectively. The second model iterative updating module is further configured to perform joint training to obtain a first encrypted accumulated value and a second encrypted accumulated value through privacy protection based on the first parameter matrix and the second parameter matrix of the second end-user device, where the first encrypted accumulated value and the second encrypted accumulated value are stored in the first end-user device and the second end-user device respectively; calculate a first encrypted gradient matrix based on the first encrypted accumulated value; and update the first parameter matrix based on the first encrypted gradient matrix. The first end-user device and the second end-user device hold the first parameter matrix and the second parameter matrix respectively, so that the parameter matrices can be involved in multiple rounds of calculation based on the training data of the first end-user device and the second end-user device, and data communication pressure caused by repeated transmission of the parameter matrices is avoided.

In some embodiments, the second model iterative updating module is further configured to receive the second encrypted accumulated value from the second end-user device; and calculate the first encrypted gradient matrix based on the first encrypted accumulated value, the second encrypted accumulated value and the training data held by the first end-user device.

In some embodiments, the second model iterative updating module is further configured to send the first encrypted gradient matrix to the second end-user device for decryption to obtain a decrypted first gradient matrix; and update the first parameter matrix based on the decrypted first gradient matrix.

In some embodiments, the second model iterative updating module is further configured to split the predicted label and the sample label into a first label and a second label based on a secret sharing system, where the first label and the second label are stored in the first end-user device and the second end-user device respectively; calculate a first error based on the first label and the first encrypted accumulated value; calculate a first portion of the first encrypted gradient matrix based on the first error and the training data held by the first end-user device; perform security matrix multiplication on the training data held by the first end-user device and a second error in the second end-user device to obtain a first fragment of a second portion of the first encrypted gradient, and obtain a second fragment of the second portion of the first encrypted gradient from the second end-user device; and calculate the first encrypted gradient matrix based on the first portion of the first encrypted gradient, the first fragment of the second portion of the first encrypted gradient and the second fragment of the second portion of the second encrypted gradient held by the second end-user device.

It should be understood that the system and the modules of the system in one or more embodiments of the present specification can be implemented in various ways. For example, in some embodiments, the system and the modules of the system can be implemented by hardware, software or a combination of the software and the hardware. The hardware part can be implemented using a dedicated logic. The software part can be stored in the memory. The system is executed through an appropriate instruction, such as a microprocessor or specially designed hardware. A person skilled in the art can understood that the previously described method and system can be implemented using computer-executable instructions and/or control code in the processor. For example, such code is provided in a medium like a magnetic disk, CE, or an EVE-ROM, a programmable memory like a ROM (firmware), or a data carrier like an optical or electrical signal carrier. The system and the modules of the system in the present specification can be implemented by a hardware circuit such as a super-large-scale integrated circuit or gate array, a semiconductor like a logic chip, a transistor, etc., or a hardware circuit of a programmable hardware device like a field-programmable gate array, a programmable logic device, etc., or can be implemented by, for example, software executed by various types of processors, or can be implemented by a combination of the previously described hardware circuit and software (for example, firmware).

It is worthwhile to note that the above descriptions about the processing devices and the modules are only for convenient description and not intended to limit the present specification in the scope of the listed embodiments. It can be understood that, after understanding the principle of the system, a person skilled in the art may freely combine each module or form a subsystem for connection with the other modules without departing from this principle.

Figure 2:
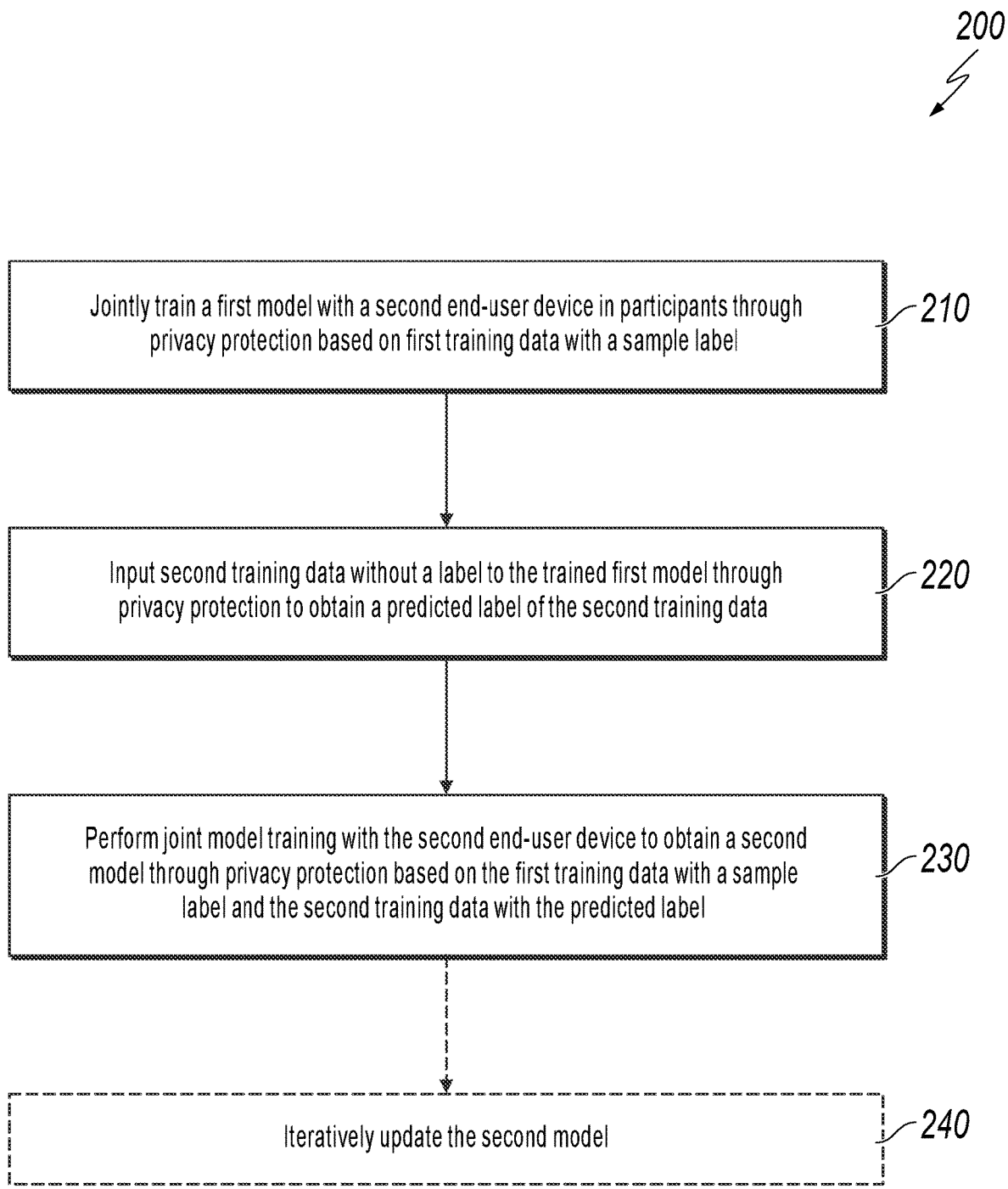
FIG. 2 is an example flowchart illustrating a method for obtaining a jointly trained model based on privacy protection, according to some embodiments of the present specification.

FIG. 2 is an example flowchart illustrating a method for obtaining a jointly trained model based on privacy protection, according to some embodiments of the present specification.

Training data for joint model training includes m data samples, and each data sample includes an n-dimensional feature. n-dimensional feature data of the m samples can be segmented horizontally or vertically and held by a first end-user device and a second end-user device respectively. Horizontal segmentation means that sample features are the same, and vertical segmentation means that there are the same quantity of samples. In the following one or more embodiments, detailed descriptions are made with vertical segmentation of the samples as an example, and A and B are used to represent a first party and a second party respectively. The first party can also be called the first end-user device, and the second party can also be called the second end-user device.

In some embodiments, the first end-user device A holds first end-user device training data (Xa) corresponding to p-dimensional features in the m samples, and the second end-user device B holds second end-user device training data (Xb) corresponding to q-dimensional features in the m samples. It is stipulated in the present specification that Xa is a matrix comprises m samples and each sample is a row vector of one row and p columns, that is, Xa is a matrix of m rows and p columns, Xb is a matrix comprises m samples and each sample is a row vector of one row and q columns, that is, Xb is a matrix of m rows and q columns, and a union of the samples of both the parties includes all samples for joint training, that is, p+q=n.

The first end-user device training data (Xa) and the second end-user device (Xb) include first training data and second training data respectively. The first training data refers to training data including sample labels ẏ, and the second training data refers to training data without sample labels initially. Specifically, the training data Xa and Xb held by the first end-user device and the second end-user device can be information in any field such as insurance, bank, medical care, etc. Taking user health information as an example, customers actually need to be examined manually by experts to determine whether the customers are healthy, so customers whose health has been examined have sample labels, and other customers who have not undergone health exams do not have sample labels. Corresponding to the stipulation in the present specification, features of the customers with sample labels are first training data, and features of the customers without sample labels are second training data.

In one or more embodiments of the present specification, the first training data and second training data in the first end-user device training data (Xa) are represented by Xa1 and Xa2 respectively. Xa1 and Xa2 include m1 pieces of data and m2 pieces of data respectively (m1+m2=m). In other words, the first end-user device training data (Xa) includes m1 pieces of first training data (Xa1) with sample labels and m2 pieces of second training data (Xa2) without sample labels initially. It is stipulated in the present specification that Xa1 and Xa2 are a matrix of m1 rows and p columns and a matrix of m2 rows and p columns respectively.

Similarly, second end-user device training data Xb also includes first training data (Xb1) and second training data (Xb2), and the first training data (Xb1) and the second training data (Xb2) include m1 pieces of data and m2 pieces of data respectively. That is, Xb1 and Xb2 are a matrix of m1 rows and q columns and a matrix of m2 rows and q columns respectively.

The following describes models jointly trained by A and B. In the present specification, the models jointly trained by A and B include a first model and a second model. The first model can be considered as an initial model, and the second model is obtained by training based on the first model.

The first model includes model parameter matrices $Wa^0$ and $Wb^0$, held by the first end-user device and the second end-user device respectively. $Wa^0$ and $Wb^0$ correspond to the p-dimensional features of the first end-user device and the q-dimensional features of the second end-user device respectively. Therefore, the parameter matrices $Wa^0$ and $Wb^0$ of the first model are a matrix of p rows and one column and a matrix of q rows and one column respectively.

The second model includes model parameter matrices Wa and Wb, which are also held by the first end-user device and the second end-user device respectively. Wa and Wb correspond to the p-dimensional features of the first end-user device and the q-dimensional features of the second end-user device respectively. Therefore, parameter matrices Wa and Wb of the second model are a matrix of p rows and one column and a matrix of q rows and one column respectively.

In the present specification, a model parameter can also be called a model for short. It is worthwhile to note that the model parameters $Wa^0$, $Wb^0$, Wa and Wb are actually vectors, and for convenient calculation and description, the model parameter is represented in a matrix form in the present specification.

In some embodiments, the sample label ẏ is held by one of A and B, but being held by the other party may not bring substantial influences. In the representation of the present specification, the sample label ẏ is a vector corresponding to the first training data and is held by B. In the embodiments of the present specification, the sample label ẏ is a column vector of m1 rows and one column.

In some embodiments, the first end-user device training data Xa and second end-user device training data Xb can further include predicted labels ÿ. The predicted label ÿ is a label generated after prediction based on the model parameter, and corresponds to the second training data without a sample label initially. In some embodiments, the predicted label ÿ can be held by one of A and B, for example, held by B. In some embodiments, the predicted label ÿ can also be split into a first predicted label $ÿ_a$ and a second predicted label $ÿ_b$ based on secret sharing, and is held and updated by the first end-user device and the second end-user device respectively. The predicted label $ÿ_a$ is a column vector of m2 rows and one column, so that both the first predicted label $ÿ_a$ and second predicted label $ÿ_b$ obtained by splitting are column vectors of m2 rows and one column.

The following exemplarily describes a method for obtaining a jointly trained model based on privacy protection with reference to the method 200 in FIG. 2.

Step 210. Jointly train a first model with a second end-user device in participants through privacy protection based on first training data with a sample label. In some embodiments, step 210 is executed by a first model acquisition module.

In some embodiments, the first model can be obtained by joint training through privacy protection based on the first training data (i.e., Xa1 and Xb1) in first end-user device training data Xa and second end-user device training dataXb. The first model includes two parameter matrices $Wa^0$ and $Wb^0$, which are stored in a first end-user device and the second end-user device respectively. It is stipulated in the present specification that $Wa^0$ and $Wb^0$ are a matrix of p rows and one column and a matrix of q rows and one column respectively.

In some embodiments, performing joint training through privacy protection means that each end-user device shares training data held by each end-user device through privacy protection to further obtain a unified data model (for example, the first model). The training data can include features and labels, or can include the features only. In this process, the training data of each end-user device participates in a training process of the model, corresponding model parameters are obtained, but the training data held by each end-user device and the obtained model parameters are not be stolen or leaked to each other. For example, the first model acquisition module obtains the training data Xb1 with a sample label ẏ in the second end-user device through privacy protection, and performs joint model training with the training data Xa1 to obtain a first parameter matrix $Wa^0$ of the first model. In some embodiments, the privacy protection includes, but not limited to, methods such as secret sharing, security matrix multiplication, and homomorphic encryption, and any combination of the secret sharing, security matrix multiplication, and homomorphic encryption. For performing joint training based on privacy protection to obtain $Wa^0$ and $Wb^0$ of the first model, references can be made to corresponding descriptions in FIG. 3, and details are omitted here for simplicity.

Step 220. Input second training data without a sample label to the trained first model through privacy protection to obtain a predicted label of the second training data. In some embodiments, the second training data held by the end-user devices respectively is confidential to each other, and privacy protection can be performed on the training data held by both parties respectively and the predicted label obtained based on the training data and the corresponding model parameters.

In some embodiments, step 220 can be executed by a predicted label acquisition module.

The predicted label acquisition module can predict the second training data Xa2 in the first end-user device training data based on the first model obtained in step 210 to obtain a first predicted label $ÿ_a$, and further to obtain first end-user device training data including the first predicted label $ÿ_a$.

It is stipulated in the present specification that the first predicted label can be calculated based on the following equation:

$$ÿ_a = Wa^0 * Xa2.$$

It can be verified that, since $Wa^0$ of the initial model is a matrix of p rows and one column and Xa2 is a matrix of m2 rows and p columns, the obtained first predicted label $ÿ_a$ is also a vector of m2 rows and one column.

Similarly, the second end-user device predicts Xb2 based on the initial model to obtain a second predicted label. For example, the second predicted label is obtained based on $ÿ_b = Wb^0 * Xb2$. It can be verified that, since $Wb^0$ is a matrix of q rows and one column and Xb2 is a matrix of m2 rows and q columns, the obtained second predicted label $ÿ_b$ is a vector of m2 rows and one column. The sample labels predicted by the first end-user device and the second end-user device are held by the end-user devices respectively, so that the security of the training data can be improved.

It is worthwhile to note that the embodiments of the present specification are described with two end-user devices as an example. In practice, the embodiments of the present specification can be extended to multiple (for example, k) end-user devices. In embodiments of the scenario, k end-user devices can add up predicted labels $ÿ_a$, $ÿ_b$, ..., and $ÿ_k$ based on privacy protection to obtain the predicted label ÿ. The predicted label ÿ can be held by any end-user device (for example, the ith party). For example, the predicted labels $ÿ_a$, $ÿ_b$, ..., and $ÿ_k$ are encrypted by a public and private key encryption method. For another example, the predicted labels $ÿ_a$, $ÿ_b$, ..., and $ÿ_k$ are encrypted by a secret sharing method.

Taking secret sharing as an example, the ith end-user device can split its own predicted label (which can be represented in a matrix form) to obtain multiple (for example, k) matrix fragments. Merely as an example, the ith end-user device splits the predicted label $ÿ_t$ into k matrix fragments of the same dimension, and a sum result of elements corresponding to each matrix fragment is equal to a corresponding element in the predicted label $ÿ_t$. The ith end-user device keeps a matrix fragment, and sends the other k−1 matrix fragments to the other end-user devices. Meanwhile, matrix fragments of k−1 predicted labels from the other end-user devices are obtained, and then the matrix fragment kept by the ith end-user device is spliced with the matrix fragments from the other end-user devices according to a predetermined sequence to obtain a spliced matrix fragment in a ciphertext form, for example, matrix fragments of different training members are spliced from top to bottom or from left to right according to the serial numbers of the training members. Finally, the spliced matrix fragments held by all the end-user devices can be summed bitwise to obtain the predicted label ÿ.

It is worthwhile to note that step 220 can be understood as, in practice, a predicted label initialization process, equivalent to a process that the first end-user device and the second end-user device generate initial values of the predicted labels $Wa^0$ and $Wb^0$ of the second training data in the training data based on $ÿ_a$ and $ÿ_b$ of the initial model (i.e., the first model). Before step 220, the second training data held by the two end-user devices A and B is training data without predicted labels.

Step 230. Perform joint model training with the second end-user device to obtain a second model through privacy protection based on the first training data with a sample label and the second training data with the predicted label. In some embodiments, step 230 is executed by a second model acquisition module.

The second model acquisition module obtains the first predicted label $ÿ_a$ based on step 220, and updates the training data Xa including the first predicted label $ÿ_a$. Furthermore, the second model acquisition module obtains the training data Xb including the second predicted label $ÿ_b$ in the second end-user device through privacy protection, and performs joint model training in combination with the training data Xa to obtain a first parameter matrix Wa of the second model. For example, the first end-user device can obtain the training data Xb based on privacy protection, perform forward propagation, calculate a loss function, and further obtain gradient information using a back propagation algorithm. Back propagation means that an error is propagated backwards to a hidden layer and an input layer by layering through an output layer to sequentially determine a corrected value (or gradient) of a model parameter of each layer. Finally, first parameter matrix Wa of the second model is obtained based on the gradient information. Similarly, the second end-user device can obtain second parameter matrix Wb of the second model based on joint model training. For more descriptions about gradient calculation and forward propagation, references can be made to the corresponding descriptions in FIG. 4 and FIG. 5, and details are omitted here for simplicity.

In some embodiments, a second model iterative updating module can further iteratively train the second model, that is, execute a process of step 240. In some embodiments, step 240 can be executed by the second model iterative updating module.

In some embodiments, the second model iterative updating module can update the first predicted label $ÿ_a$ based on the second model Wa obtained by a previous round of iteration. Specifically, the second model iterative updating module can obtain a calculation result ya corresponding to the whole first end-user device training data Xa based on first parameter matrix Wa, and update a corresponding part of the first predicted label based on the calculation result.

In the representation of the present specification, the calculation result ya can be represented as follows:

$$ya = Xa * Wa.$$

Since second parameter matrix Wa is a matrix of p rows and one column and Xa is a matrix of m rows and p columns, it is clear that the obtained calculation result ya is a vector of m rows and one column.

In some embodiments, the second model iterative updating module use the obtained calculation result ya to update the predicted label $ÿ_a$ in the first end-user device training data. In other words, calculation result ya is used to update m2 label values corresponding to the first predicted label $ÿ_a$ only but not update a label value of the label ÿ. Similarly, for the second end-user device, an obtained calculation result is also used to update a label value corresponding to the second predicted label $ÿ_b$ only.

The first end-user device training data and the second end-user device training data are re-updated based on the obtained predicted labels $ÿ_a$ and $ÿ_b$, and furthermore, the second model is retrained through privacy protection based on the updated first end-user device training data and second end-user device training data. Such operations are repeated until iteration of the model is completed. For more descriptions about iterative updating of the second model based on privacy protection, references can be made to the corresponding descriptions in FIG. 4 and FIG. 5, and details are omitted here for simplicity.

It is worthwhile to note that whether to perform a next round of iteration needs to be determined after each round of updating of the model parameter. A determining criterion for model iteration can be whether an iteration count reaches a predetermined iteration count, whether the updated second model satisfies a predetermined performance index threshold, etc., or whether an instruction of terminating training is received. If determining that the next round of iteration is needed, the first end-user device and the second end-user device can perform the next round of iteration based on updated model fragments obtained in the present iteration process. If determining that the next round of iteration is not needed, the first end-user device and the second end-user device determine that iteration is completed, and obtain the finally determined second model.

Figure 3:
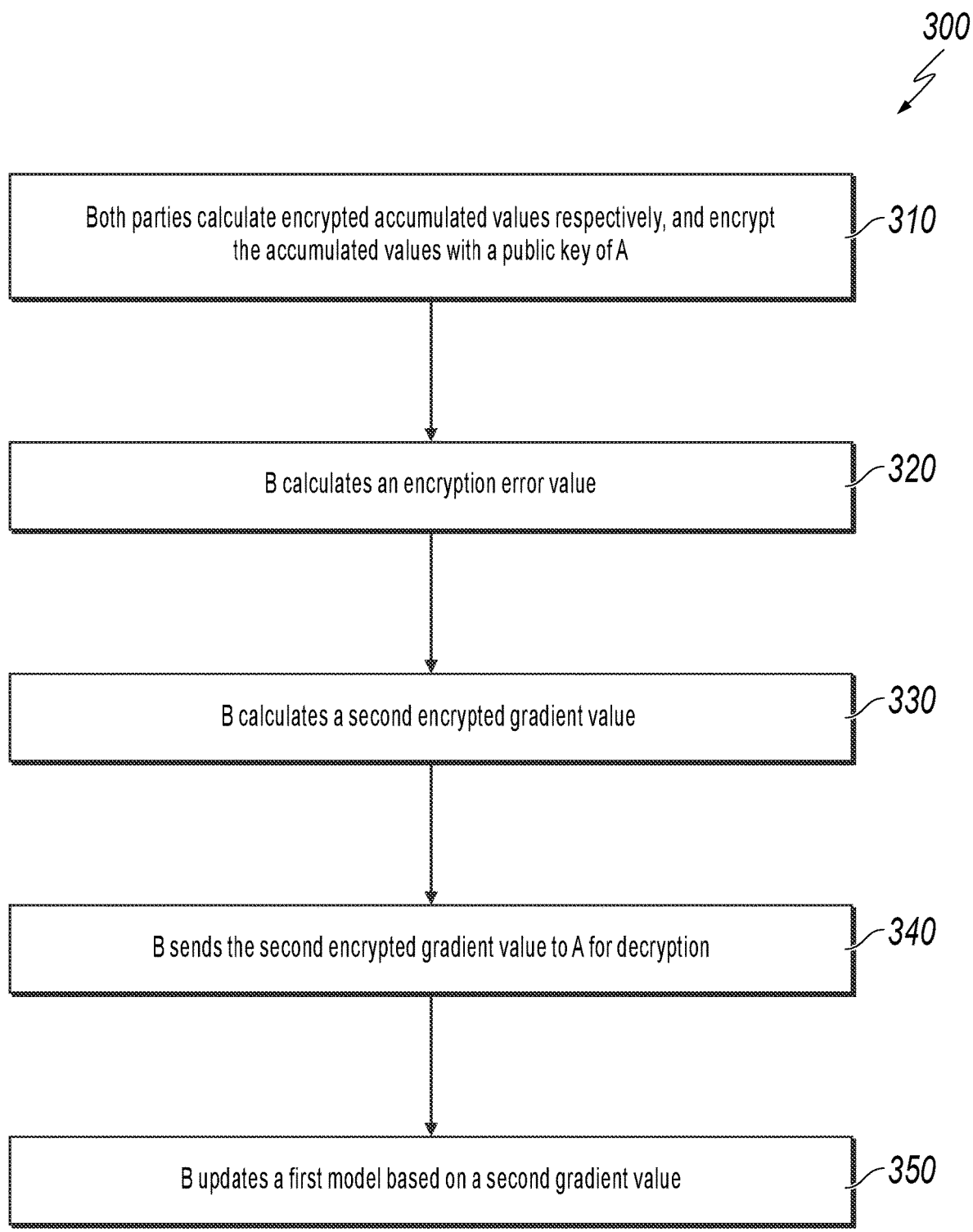
FIG. 3 is an example flowchart illustrating obtaining a first model based on homomorphic encryption, according to some embodiments of the present specification.

FIG. 3 is an example flowchart illustrating obtaining a first model based on homomorphic encryption, according to some embodiments of the present specification.

In some embodiments, one or more than one step in the method 300 can be implemented in the system 100 shown in FIG. 1. For example, one or more steps in the method 300 can be stored in the storage device in an instruction form, and is invoked and/or executed by the processing device.

For convenient description, FIG. 3 describes a process of obtaining the first model in detail with two end-user devices (e.g., the first end-user device and the second end-user device) as an example. Holding states of training data and sample labels held by the two end-user devices are the same as FIG. 2, and details are omitted here for simplicity.

In some embodiments, the first end-user device A has its own public key PKa and private key SKa. In one or more embodiments of the present specification, public key PKa and private key SKa of A can also be called a first end-user device public key and a first end-user device private key. For any variable X, [X]a represents encrypting X with public key PKa of A.

The previously stipulated representation method and variable names and the equations and other expressions in the present specification are only for understanding the methods in the present specification better. When the present specification is used, various insubstantial transformations can be made to the representation method, the variable names, the equations, the calculation methods, etc., based on common operation principles, technical principles and technical methods without affecting the essences and corresponding technical effects, for example, but not limited to, changing orders of rows or columns, transforming to equivalent forms during matrix multiplication, and representing the same calculation by other calculation forms.

Step 310. Both the parties calculate accumulated values Ua and Ub respectively, and encrypt the accumulated values with the public key of A.

The first end-user device and the second user-end device transmit their own public keys to each other, that is, the first party transmits its own public key to the second party for use in subsequent data encryption. For example, A can transmit its own public key to B through the network 130. In the representation stipulated in the present specification, A transmits its own public key PKa for B.

Both the parties perform product operation on held model parameters and feature data respectively, and encrypt their own product operation results with public key PKa of the first party. The first party sends encrypted data to the second party.

In the representation stipulated in the present specification, party A calculates Ua (where Ua=Xa1×Wa$^o$), encrypts Ua using PKa to obtain [Ua]a, and sends a calculation result to B. Similarly, party B calculates Ub (where Ub=Xb1×Wb$^o$ to obtain [Ub]a. Each of obtained Ua, [Ua]a, Ub and [Ub]a is a matrix of m1 rows and one column.

In one or more embodiments of the present specification, a used encryption algorithm is a homomorphic encryption algorithm. The homomorphic encryption algorithm means that, for an encryption function $f$, for any A and B, $f(A)+f(B)=f(A+B)=f(B)+f(A)$, $f(A)\times f(B)=f(A\times B)$. Corresponding to the present embodiments, [Ua]a+[Ub]a=[Ua+Ub]a=[Ub]a+[Ua]a.

Step 320. B calculates an encryption loss value.

The second party that has the encrypted accumulated values of both the parties sums the encrypted data of both the parties by addition. Since the encryption algorithm is the homomorphic encryption algorithm, a sum value is equal to an encrypted value after unencrypted data of both the parties is added up. For a calculation equation for the encryption loss value, references can be made to the corresponding descriptions in FIG. 4, and details are omitted here for simplicity.

In the representation stipulated in the present specification, the encryption loss value is [E]a=[ŷ−yb]a=[z]a/4+[0.5−yb]a.

[z]a=[Ua]a+[Ub]a=[Ua+Ub]a, ŷ represents a predicted value of the model, and yb represents the label corresponding to second-party training data Xb. In some embodiments, yb can be considered as a serial set of the second predicted labels ŷb and the sample labels ẏ.

Encryption loss value [E]a calculated in this way is a matrix of m rows and one column.

Step 330. B calculates a second encrypted gradient matrix.

The second party substitutes the encryption loss value into a gradient descent equation, that is, performs product operation on the encryption loss value and data corresponding to its own feature, to calculate the second encrypted gradient matrix.

In the representation stipulated in the present specification, party B uses a gradient calculation equation for calculation:

$$[Gb]a = \left[\frac{\partial L}{\partial w}\right]a = [Xb^T(\hat{y} - yb)]a = [Xb]a^T \times [d]a.$$

[d]=−(ŷ−yb). B obtains second encrypted gradient matrix [Gb]a encrypted with PKa based on homomorphic multiplication. Second gradient matrix Gb obtained in this way is a matrix of q rows and one column. In some embodiments, the second encrypted gradient matrix [Gb]a can also be obtained by homomorphic addition. For example, $$[Gb]a = \left[\frac{\partial L}{\partial w}\right]a = [Xb^T(\hat{y} - yb)]a = Xb \times [d]a.$$

Step 340. B sends the second encrypted gradient matrix to A for decryption.

The second party adds a first mask encrypted with the public key of the first party to the second encrypted gradient matrix for sending to the first party. The first party decrypts the received encrypted data with its own private key. The first mask is a numerical value set by the second party for a main purpose of preventing A from determining the encrypted second gradient matrix. A setting range of a specific numerical value of the first mask is not limited in the present specification if the previously described purpose can be achieved.

In the representation stipulated in the present specification, party B calculates and sends [Gb]a+[mask1]a to party A.

In the present embodiments, mask1 is the first mask, and is the same as the second gradient matrix Gb in dimension, so Gb+mask1 is also a matrix of q rows and one column.

Party A obtains [Gb]a+[mask1]a. Since the encryption algorithm is homomorphic encryption, [Gb]a+[mask1]a=[Gb+mask1]a. Party A obtains Gb+mask1 by decryption with SKa. Party A does not know the value of mask1, and thus cannot determine a value of Gb.

Step 350. B updates the first model based on the second gradient matrix.

The second party calculates its own second gradient matrix, and performs product operation on the second gradient matrix and learning rate to update the first model Wb$^o$.

In the representation stipulated in the present specification, party B calculates and updates Wb$^o$=Wb$^o$−learning_rate×Gb. In the present specification, learning rate represents a hyper-parameter affecting a descent rate in a gradient descent method.

The above embodiments are example descriptions made with the second end-user device B as an example. Similarly, for the first end-user device A, A sends the encrypted first encrypted gradient to B for decryption to obtain the first gradient matrix, and performs product operation on the first gradient matrix and learning rate to update the first model, That is, party A calculates Wa$^o$=Wa$^o$−learning_rate×Ga.

The previously described process describes a gradient descent process, and this process can be iterated till convergence to complete training the first model. In this process, both parties cannot determine the data held by each other.

It is worthwhile to note that the method 300 describes a detailed process of training the first model with some embodiments of homomorphic encryption as an example. In some other embodiments, privacy-protection-based joint training can also be implemented in other ways. For example, in step 350, a second mask does not need to be added, and an encryption error value can be encrypted with the public key of party B to achieve similar effects.

Figure 4:
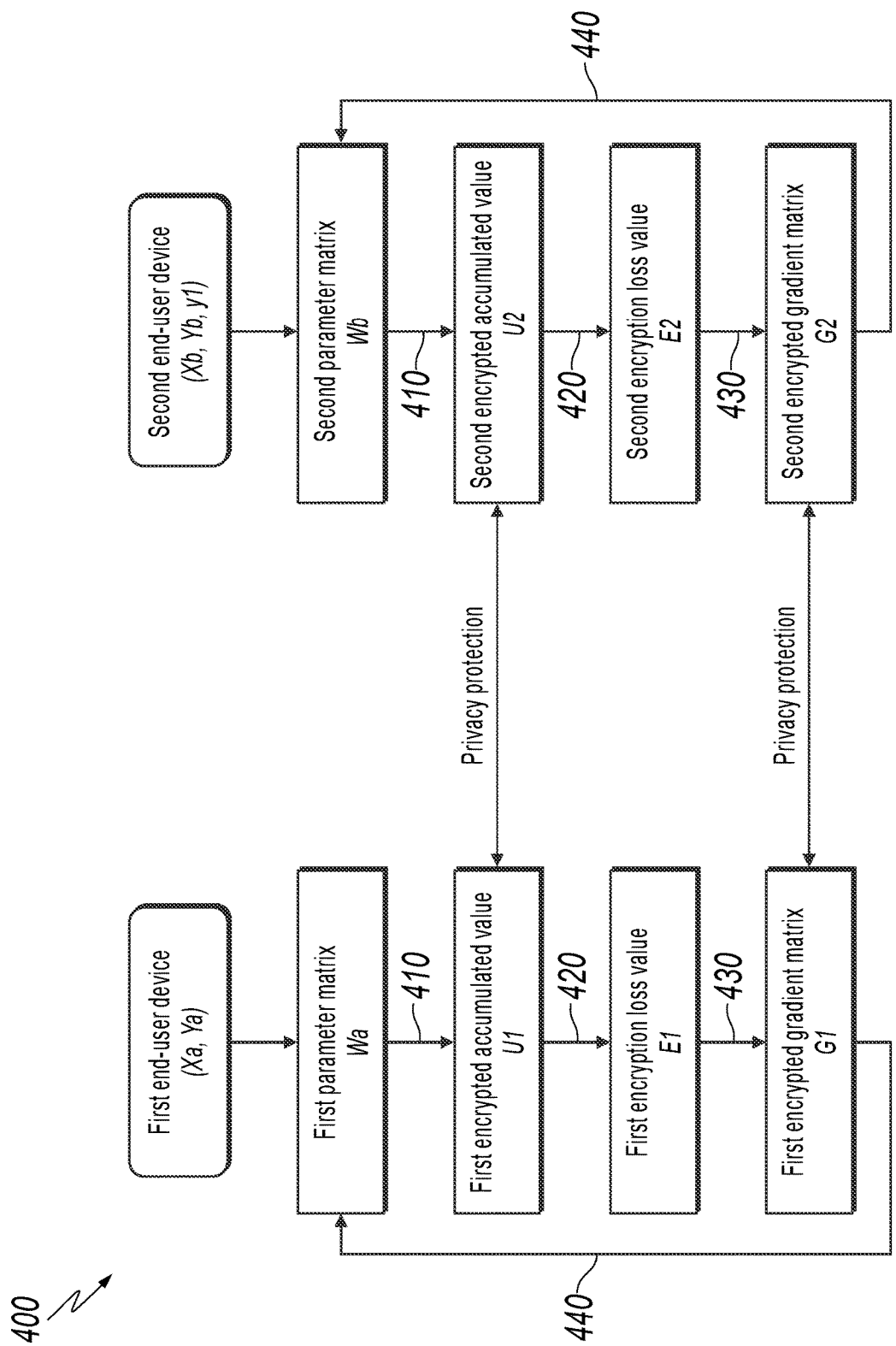
FIG. 4 is an example flowchart illustrating iteratively updating a second model based on homomorphic encryption, according to some embodiments of the present specification.

FIG. 4 is an example flowchart illustrating iteratively updating a second model based on homomorphic encryption, according to some embodiments of the present specification.

In some embodiments, one or more than one step in the method 400 can be implemented in the system 100 shown in FIG. 1. For example, one or more than one step in the method 400 can be stored in the storage device in an instruction form, and is invoked and/or executed by the processing device.

Holding states of data for joint model training in FIG. 4 are similar to those in FIG. 2, and details are omitted here for simplicity.

In some embodiments, [X] can be used to represent that matrix X is encrypted. Unless further stated, [X] can represent encrypting matrix X by any encryption method. In some embodiments, for any variable X, [X] represents encrypting X with public key PKa of A.

Step 410. The second end-user device performs joint training with the first end-user device to obtain a first encrypted accumulated value and a second encrypted accumulated value through privacy protection based on the first parameter matrix and the second parameter matrix.

In some embodiments, encrypted accumulated values U1 and U2 can be obtained by a homomorphic encryption method. For example, both the parties perform product operation on the held model parameters and feature data respectively to store U1 and U2 respectively, and encrypt their own product operation results with public key PKa of the first end-user device. The first end-user device sends encrypted data [U1]a to the second party. The encrypted accumulated values [U1]a and [U2]a can be calculated through the following equations:

$$[U1]a=[Wa*Xa]a;\ [U2]a=[Wb*Xb]a.$$

It is worthwhile to note that, in a first round of calculation in multiple rounds of iterative calculation, Wa and Wb can be obtained $Wa^0$ and $Wb^0$ of the trained first model in FIG. 3. Calculating the accumulated values [U1]a and [U2]a using $Wa^0$ and $Wb^0$ of the first model is equivalent to generating the initial value of the second model in an initialization process in the iteration process of the second model. In the other rounds of calculation in the multiple rounds of calculation, Wa and Wb are model parameters in the previous rounds of calculation.

In some embodiments, the first end-user device can send accumulated value U1 to the second end-user device in a way of adding the first mask. In the present embodiments, the first encrypted accumulated value can be understood as an operation result of the first accumulated value and the first mask. In some embodiments, the operation can include product operation or sum operation. The first mask can also include one value, or can include multiple values. For example, if first mask mask1 is a value and the operation is sum operation, the first encrypted accumulated value can correspondingly be U1+mask1. For another example, if first mask mask1 is a matrix and the operation is product operation, the first encrypted accumulated value can correspondingly be U1*mask1.

Step 420. The second end-user device updates second encryption loss value E2 based on second encrypted accumulated value U2.

When a loss value is calculated, a Sigmoid function can be approximately calculated using a Taylor expansion. Since the Taylor expansion is polynomial sum and multiplication operation, and can support homomorphic encryption, an approximate loss value can be calculated in an encryption state through the Taylor expansion.

In some embodiments, the Taylor expansion can be an n-order Taylor expansion.

$$\hat{y} = \text{Sigmoid}(z) = \frac{1}{1+e^{-z}} \approx \frac{1}{2} + \frac{1}{4}z - \frac{1}{48}(z)^3 + \frac{1}{480}(z)^5 + \ldots =$$
$$\frac{1}{2} + \frac{1}{4}wx - \frac{1}{48}(z)^3 + \frac{1}{480}(z)^5 + \ldots.$$

For convenient calculation, in some embodiments, a Taylor expansion with a certain number of orders is often used for approximate calculation. It is worthwhile to note that, if the order number of the used Taylor expansion is larger, the approximate calculation accuracy is higher, but a calculation process is more complex and a calculation speed is slower. For description, in one or more embodiments shown in FIG. 4, example descriptions are made with a first-order Taylor expansion as an example. The following detailed disclosure is merely an example and not intended to form limits to the present specification.

In other embodiments, the Sigmoid function can also be replaced with another function that can be used for approximation calculation, or Sigmoid can be expanded using another expansion to replace the Sigmoid function. As long as the replacing function supports at least one of product operation and sum operation, no other limits are made in the present specification.

In some embodiments, when the second end-user device obtains the first encrypted accumulated value [U1]a obtained by homomorphic encryption, second encryption loss value [E2] can be calculated based on the following equation.

$$[E2]a=[\hat{y}-yb]a.$$

$\hat{y}$ represents the predicted value of the model, and is obtained based on the Sigmoid function. yb, in the equation, is the serial set of the second predicted values $\ddot{y}_b$ and the sample labels $\dot{y}$, and represents all the labels corresponding to the second end-user device training data. Second encryption loss value [E2]a calculated in this way is a matrix of m rows and one column.

In some embodiments, the first end-user device can send accumulated value U1 to the second end-user device in the way of adding the first mask, second encryption loss value [E2] can also be calculated based on the previously described equation, and only first mask mask1 needs to be put into the equation for calculation.

Step 430. The second end-user device updates a second encrypted gradient matrix based on second encryption loss value [E2].

The second end-user device calculates the corresponding second encrypted gradient matrix based on the error value and second end-user device training dataXb.

Specifically, when second encryption loss value [E2] is encrypted by the homomorphic encryption method, the second encrypted gradient can be calculated based on the following equation:

$$[Gb]a = \left[\frac{\partial L}{\partial w}\right]a = [Xb^T(\hat{y} - yb)]a = [Xb]a^T \times [E2]a.$$

When second encryption loss value E2 is encrypted with the first mask, the second encrypted gradient can be calculated based on the following equation:

$$[Gb] = \left[\frac{\partial L}{\partial w}\right] = [Xb^T(\hat{y} - yb)] = [Xb]^T \times [E2 + \text{mask1}].$$

Step 440. The first end-user device and the second end-user device update model parameters Wa and Wb based on the first encrypted gradient matrix and the second encrypted gradient matrix.

In some embodiments, when the second encrypted gradient is encrypted with the first mask, the second end-user device can obtain a corresponding second decrypted gradient based on second encrypted gradient [Gb+mask1] in a way of adding the second mask mask2. Specifically, (1) the second end-user device determines a corresponding first mask gradient based on second encrypted gradient [Gb+mask1] and the second mask mask2, and transmits first mask gradient [Gb+mask1+mask2] to the first end-user device holding an encryption key of the second encrypted gradient; (2) the first end-user device decodes received first mask gradient [Gb+mask1+mask2], and transmits corresponding first decoding result [Gb+mask2] to the second end-user device; and (3) the second end-user device removes the second mask to obtain second decrypted gradient Gb based on received first decoding result [Gb+mask2] and the second mask.

In some embodiments, when the second encrypted gradient is encrypted by the homomorphic encryption method, the second end-user device can also obtain the corresponding second decrypted gradient based on the second encrypted gradient [Gb]a in the way of adding the second mask mask2. Specifically, (1) the second end-user device determines a corresponding first mask gradient based on second encrypted gradient [Gb]a and the second mask mask2, and transmits first mask gradient [Gb+mask2]a to the first end-user device holding the encryption key of the second encrypted gradient; (2) the first end-user device performs homomorphic decoding on received first mask gradient [Gb+mask2]a, and transmits a corresponding decoding result Gb+mask2 to the second end-user device; and (3) the second end-user device removes second mask mask2 to obtain second decrypted gradient Gb based on received decoding result Gb+mask2 and the second mask.

In some embodiments, the above operation can include at least one of product operation and sum operation. The first mask can also include one value, or can include multiple values. For example, in some embodiments, if first mask mask1 is a value and the operation is sum operation, the second encrypted gradient can correspondingly be [Gb]a+[mask1]a. In some embodiments, when the first mask is added by product operation, the second encrypted gradient can also be [Gb]*[mask1].

The second end-user device performs product operation on the second gradient matrix and learning rate to update the model based on the obtained second gradient matrix, Wb=Wb−learning_rate×Gb, where learning rate represents a hyper-parameter affecting a descent rate in the gradient descent method.

The previously described process 410 to 440 describes a gradient descent process, and this process can be iterated till convergence to complete training of the model Wa and Wb. In this process, both parties cannot determine the data held by each other.

It is worthwhile to note that steps 410 to 440 are example descriptions about the iteration process of the second model with the second end-user device as an example. For the first end-user device, model training can be performed based on a method similar to steps 410 to 440. For example, the first end-user device can add the public key of the second end-user device to the first end-user device training data, the second end-user device can add the public key of the second end-user device to the second end-user device training data for sending to the first end-user device, and training is performed based on steps 410 to 440. The first end-user device can update model parameter Wa based on Wa=Wa−learning_rate×Ga after obtaining the decrypted first gradient matrix Ga.

It is worthwhile to note that the previous descriptions about the flow 400 are only example descriptions and not intended to limit the application scope of the present specification. A person skilled in the art can make various modifications and variations to the flow 400 under the guidance of the present specification. For example, the gradient descent method can also be replaced with other parameter optimization methods, such as a Newton descent method, for model updating calculation. However, these modifications and variations still fall within the scope of the present specification.

Figure 5:
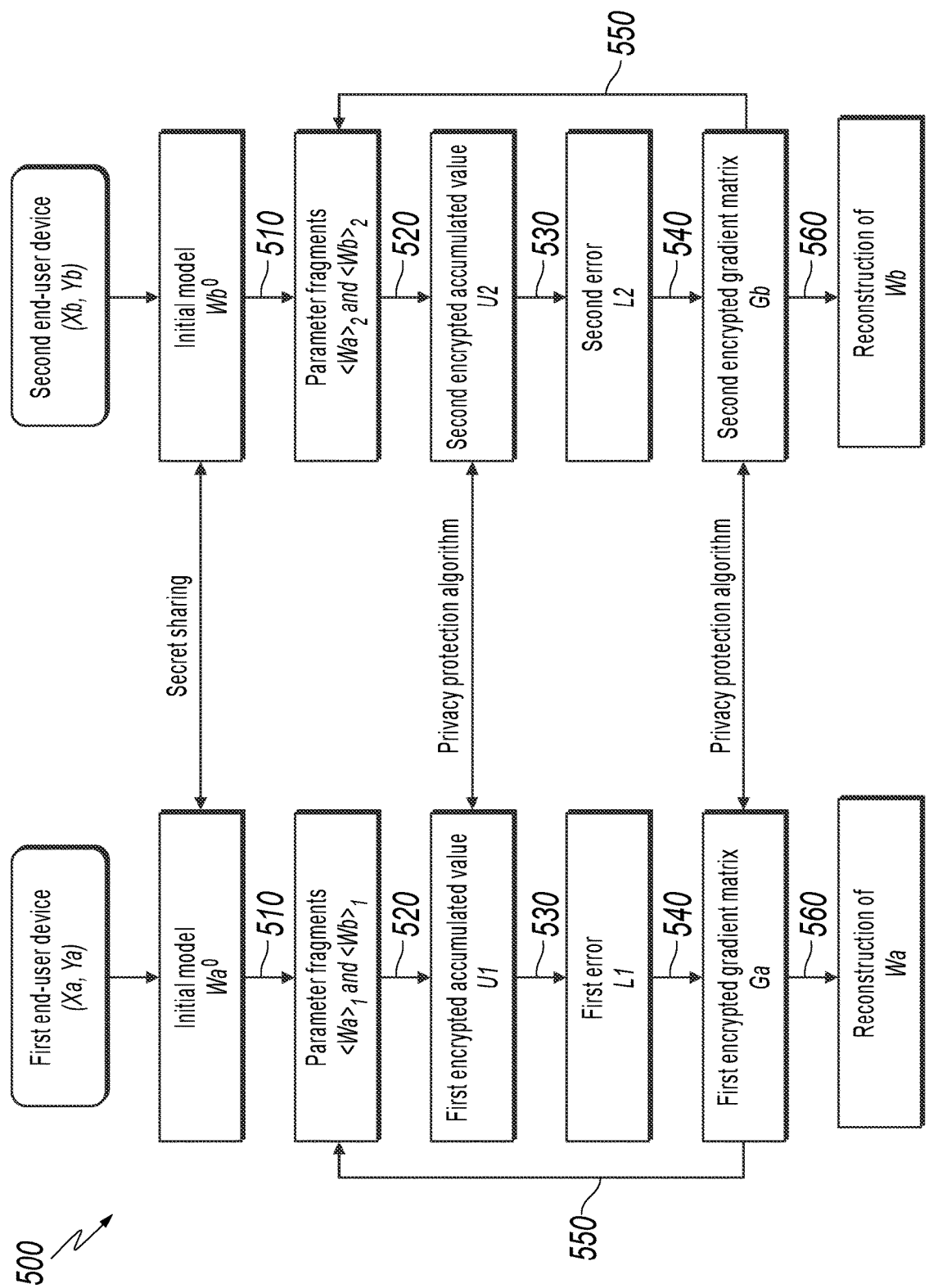
FIG. 5 is an example flowchart illustrating iteratively updating a second model based on secret sharing, according to some other embodiments of the present specification.

FIG. 5 is an example flowchart illustrating a method 500 for iteratively training a second model based on secret sharing, according to some embodiments of the present specification.

Data holding states of the first end-user device A and the second end-user device B in FIG. 5 are the same as those in FIG. 2, and details are omitted for simplicity.

In some embodiments, <X> represents performing secret fragmentation on matrix X, and the serial number of a corresponding fragment is represented by a subscript. For example, <X>$_1$ represents a first fragment of matrix X, and <X>$_2$ represents a second fragment of matrix X.

In some embodiments, the predicted label ÿ and the sample label ẏ can be split into a first label $\overline{Ya}$ and a second label $\overline{Yb}$ based on a secret sharing method, where the first label $\overline{Ya}$ and the second label $\overline{Yb}$ are stored in the first end-user device and the second end-user device respectively. In some embodiments, the first label $\overline{Ya}$ can be understood as a spliced vector of the first predicted label ÿ$_a$ and a part of the sample label ẏ, and the second label $\overline{Yb}$ can be understood as a spliced vector of the second predicted label ÿ$_b$ and the another part of the sample label ẏ. In some embodiments, the whole sample label ÿ$_b$ can be combined with the first predicted label ÿ$_a$ and the second predicted label ÿ$_b$ to obtain a first predicted label Ya and a second predicted label $\overline{Yb}$ respectively.

Step 510. Perform secret sharing on parameter matrices Wa and Wb.

The first end-user device A and the second end-user device B initialize model parameters Wa and Wb, perform secret sharing, and keep parameter fragments respectively. For acquisition of Wa$^0$ and Wb$^0$ of the initial model, references can be made to the corresponding descriptions in FIG. 3, and details are omitted here for simplicity.

The first end-user device splits model Wa to be trained corresponding to the first training data in the first end-user device training data into first parameter first fragment <Wa>$_1$ and first parameter second fragment <Wa>$_2$, keeps first parameter first fragment <Wa>$_1$ to the first end-user device, and sends first parameter second fragment <Wa>$_2$ to second end-user device B. It can be understood that a sum of the two parameter fragments is a first parameter portion, that is, Wa=<Wa>$_1$+<Wa>$_2$.

Correspondingly, the second end-user device splits model Wb to be trained corresponding to the first training data in the second end-user device training data into second parameter first fragment <Wb>$_1$ and second parameter second fragment <Wb>$_2$, keeps second parameter second fragment <Wb>$_2$ itself, and sends second parameter first fragment <Wb>$_1$ to first end-user device A. It can be understood that a sum of the two parameter fragments is a first parameter portion, that is, $Wb=<Wb>_1+<Wb>_2$.

After the previously described secret sharing, the first end-user device A keeps first parameter first fragment $<Wa>_1$ and second parameter first fragment $<Wb>_1$, and the second end-user device B keeps first parameter second fragment $<Wa>_2$ and second parameter second fragment $<Wb>_2$.

Step 520. Obtain first encrypted accumulated value U1 and second encrypted accumulated value U2.

The first end-user device A calculates a product of first end-user device training data Xa and first parameter first fragment $<Wa>_1$ to obtain first processing result $<U1>_1$ of the first accumulated value, that is, $<U1>_1=Xa*<Wa>$.

The first end-user device A performs a privacy protection algorithm on first end-user device training data Xa held by the first end-user device and first parameter second fragment $<Wa>_2$ held by the second end-user device B based on security matrix multiplication. The privacy protection algorithm can be implemented by homomorphic encryption, secret sharing or other security calculation methods, and no limits are made thereto. A product of first end-user device training data Xa and first parameter second fragment $<Wa>_2$ is recorded as second processing result $<U1>_2$ of the first accumulated value, that is, $<U1>_2=Xa*<Wa>_2$.

Similarly, the second end-user device obtains a first processing result $<U2>_1$ of the second accumulated value based on a product of second end-user device training data Xb and second parameter first fragment $<Wb>_1$, that is, $<U2>_1=Xb*<Wb>_1$, and obtains second processing result $<U2>_2$ of the second accumulated value, that is, $<U2>_2=Xb*<Wb>_2$.

Step 530. Update the first loss value and the second loss value based on first encrypted accumulated value U1 and second encrypted accumulated value U2.

When a loss value is calculated, a Sigmoid function can be approximately calculated using a Taylor expansion. In some embodiments, the Taylor expansion can be an n-order Taylor expansion. For related descriptions about approximate calculation of the loss value, references can be made to the related descriptions in FIG. 4.

In the scenario shown in FIG. 5, the first end-user device A and the second end-user device B hold first encrypted accumulated value U1 and second encrypted accumulated value U2 as well as predicted labels $\overline{Ya}$ and $\overline{Yb}$ respectively.

In the embodiments of this scenario, the second end-user device B can subtract second label fragment $\overline{Yb}$ from second accumulated value U2, and determines an obtained calculated difference value as second error L2. Similarly, the first end-user device A can subtract first label fragment $\overline{Ya}$ from first accumulated value U1, and determines an obtained calculated difference value as first error L1.

Step 540. The first encrypted gradient matrix and the second encrypted gradient matrix are updated based on the first error and the second error.

For a calculation equation for the gradient matrix, references can be made to the description in FIG. 4. Specifically, the second encrypted gradient can be calculated by the privacy protection method. "Encrypted" in the encrypted gradient means that part of operational data of the gradient is prevented from being obtained by the calculation party. In some embodiments, an "encryption" process can be completed by a trusted third party. For example, the second end-user device B needs to use first error L1 when calculating a first portion of the second encrypted gradient. In such case, the first end-user device A sends first error L1 to the third party, and the third party sends a calculated result to second end-user device B.

Second encrypted gradient Gb can be obtained through the following equations:

the first portion of the second encrypted gradient: $<G_b>_1=L1*Xb$; and a second portion of the second encrypted gradient: $<G_b>_2=L2*Xb$.

$G_b=<G_b>_1+<G_b>_2$, and L1 and L2 are stored in the first end-user device and the second end-user device respectively, and cannot obtained by the each other.

Similarly, first encrypted gradient Ga can be obtained through the following equations:

a first portion of the first encrypted gradient: $<G_a>_1=L1*Xa$;

a second portion of the first encrypted gradient: $<G_a>_2=L2*Xa$; and $Ga=<Ga>1+<Ga>2$.

Step 550. Update model parameters Wa and Wb based on the first encrypted gradient matrix and the second encrypted gradient matrix.

The first end-user device and the second end-user device perform model updating based on the obtained first encrypted gradient matrix and second encrypted gradient matrix. For example, Wa and Wb can be updated according to the following equations.

The first end-user device calculates:

$<Wb>_1=<Wb>_1-\text{learning\_rate}\times<G_b>_1$; and $<Wa>_1=<Wa>_1-\text{learning\_rate}\times<G_a>_1$.

The second end-user device calculates:

$<Wa>_2=<Wa>_2-\text{learning\_rate}\times<G_a>_2$; and $<Wb>_2=<Wb>_2-\text{learning\_rate}\times<G_b>_2$.

learning rate represents a hyper-parameter affecting a descent rate in the gradient descent method.

Whether to perform a next round of iteration needs to be determined after each round of updating of the model parameter. A determining criterion for model iteration can be whether an iteration count reaches a predetermined iteration count, whether the updated model satisfies a predetermined performance index threshold, etc., or whether an instruction of terminating training is received. If determining that the next round of iteration is needed, the first end-user device and the second end-user device can perform the next round of iteration based on updated model fragments obtained in the present iteration process. In other words, the first end-user device and the second end-user device use the updated model fragments obtained in the present round of iteration as models to be trained in the next round of iteration. If determining that the next round of iteration is not needed, the first end-user device and the second end-user device determine that iteration is completed, and perform step 560 for model reconstruction to obtain the finally determined second model.

Step 560. After model iteration is completed, reconstruct Wa and Wb, and output $\overline{Ya}$ and $\overline{Yb}$.

After iterative training is completed, the first end-user device A sends iteratively maintained second parameter first fragment $<Wb>_1$ to the second end-user device, and the second end-user device B sends iteratively maintained first parameter second fragment $<Wa>_2$ to the first end-user device. After reconstruction, trained second models Wa and Wb are obtained, and finally determined predicted labels $\overline{Ya}$ and $\overline{Yb}$ are output.

Beneficial effects that may be achieved by the embodiments of the present specification include but are not limited to the following: (1) An effective jointly trained model is trained using a small number of labeled samples and a large number of unlabeled samples. (2) Sample labels of the unlabeled samples are predicted using the jointly trained model based on the privacy protection method. (3) The predicted sample labels are held by an end-user device, so that the data security is improved. It is worthwhile to note that different embodiments have different achievable beneficial effects. In different embodiments, the achievable beneficial effects can be any one or combination of several of the above, or can be any other achievable beneficial effects.

The above describes the basic concepts. It is clear that, for a person skilled in the art, the previously described detailed disclosure is merely an example and not intended to limit the present specification. Although not clearly stated here, a person skilled in the art may make various modifications, improvements and corrections to the present specification. Such modifications, improvements and corrections are suggested in the present specification, and thus these modifications, improvements and corrections still fall within the spirit and scope of the embodiments illustrated in the present specification.

In addition, specific terms are used in the present specification to describe the embodiments of the present specification. For example, "an embodiment", "one embodiment", and/or "some embodiments" refer to a certain feature, structure or characteristic related to at least one embodiment of the present specification. Therefore, it is worthwhile to emphasize and note that "one embodiment", or "an embodiment" or "an alternative embodiment" mentioned twice or for many times at different parts in the present specifications does not always refer to the same embodiment. In addition, some features, structures or characteristics in one or more embodiments of the present specification can be combined as appropriate.

Moreover, a person skilled in the art can understand that each aspect of the present specification can be explained and described through a plurality of patentable types or conditions, including combinations of any new and useful procedures, machines, products or substances, or any new and useful improvements made thereto. Correspondingly, each aspect of the present specification can be executed completely by hardware, or executed completely by software (including firmware, resident software, microcode, etc.), or executed by a combination of the hardware and the software. The above hardware or software can be called a "data block", a "module", an "engine", a "unit", a "component", or a "system". In addition, each aspect of the present specification can be represented as a computer product in one or more computer-readable media, and the product includes a computer-readable program code.

The computer storage medium may include a propagated data signal including a computer program code, for example, on a baseband or as a part of a carrier. The propagated signal may be represented in many forms, including an electromagnetic form, an optical form, etc., or a proper combined form. The computer storage medium can be any computer-readable medium except a computer-readable storage medium, and the medium can be connected to at least one instruction execution system, apparatus or device to implement a program for communication, propagation or transmission. The program code in the computer storage medium can be propagated through any suitable medium, including radio, a cable, an optical cable, a radio frequency (RF), or a similar medium, or any combination of the previously described media.

The computer program code needed by the operation of each part of the present specification can be edited using any one or more program languages, including object-oriented program languages such as JAVA, SCALA, SMALLTALK, EIFFEL, JAEE, EMERALE, C++, C#, VB.NET, and PYTHON, conventional procedural programming languages such as the C language, VISUALBASIC, FORTRAN2003, PERL, COBOL2002, PHP, and ABAP, dynamic programming languages such as PYTHON, RUBY, and GROOVY, other programming languages, etc. The program code can totally be run in a user computer, or run in the user computer as an independent software package, or the part run in the user computer is run in a remote computer, or the program code is totally run in the remote computer or a processing device. In the latter case, the remote computer can be connected with the user computer in any network form, such as a local area network (LAN) or a wide area network (WAN), or connected to an external computer (for example, through the Internet), or in a cloud computing environment, or used as service, such as software as a service (SaaS).

In addition, unless clearly stated in the claimed, the orders of the processing elements and sequences, use of numbers and letters, or use of other names in the present specification is not intended to limit the orders of the flows and methods of the present specification. Although some inventive embodiments presently considered to be useful are discussed in the previous disclosure with various examples, it should be understood that such details are only for a purpose of description, the appended claims are not limited to the disclosed embodiments, and instead, the claims are intended to cover all corrections and equivalent combinations satisfying the essence and scope of the embodiments of the present specification. For example, the previously described system components can be implemented by hardware devices, but can be implemented only through software. For example, the described system is installed in an existing processing device or mobile device.

Similarly, it is worthwhile to note that, to simplify the expression of the disclosure in the present specification to help understand one or more inventive embodiments, many features may sometimes be combined into one embodiment or accompanying drawing or the descriptions made thereto in the previous descriptions about the embodiments of the present specification. However, this disclosure method does not mean that the object of the present specification needs more features than those mentioned in the claims. In practice, the features of the embodiments are fewer than all features in a single embodiment that is disclosed above.

In some embodiments, figures describing the numbers of components and attributes are used. It should be understood that such figures used to describe the embodiments are modified with modifiers "about", "approximately" or "substantially" in some examples. Unless otherwise stated, "about", "approximately" or "substantially" represents that the figure allows a change of ±20%. Correspondingly, in some embodiments, all the numerical parameters used in the specification and the claims are approximate values, and the approximate values can change according to the characteristics needed by individual embodiments. In some embodiments, for the numerical parameters, specified significant digits should be considered, and a general digit reservation method is adopted. Although numerical ranges and parameters used to confirm the scopes in some embodiments of the present specification are approximate values, such numerical values should be set in specific embodiments as accurately as possible in feasible ranges.

All contents for each patent, patent application, patent application disclosure and other material, such as an article, a book, a specification, a publication, and a document, cited in the present specification are incorporated by reference in the present specification. Historical application files inconsistent with or conflicting with the contents of the present specification are excluded, and files (appended in the present specification presently or later) limiting the largest scope of the claims of the present specification are also excluded. It is worthwhile to note that the descriptions, definitions and/or use of terms, inconsistent with or conflicting with the contents of the present specification, in the material appended in the present specification are subject to the definitions and/or use of terms in the present specification.

Finally, it should be understood that the embodiments in the present specification are used to describe the principles of the embodiments of the present specification only. Other transformations may also fall within the scope of the present specification. Therefore, as an example rather than a limit, alternative configurations of the embodiments of the present specification can be considered to be consistent with the teachings of the present specification. Correspondingly, embodiments of the present specification are not limited to the embodiments clearly introduced and described in the present specification.

What is claimed is:

1. A computer-implemented method, comprising:
   jointly training a first model, by a first device and with a second device, wherein the first device and the second device each hold respective training data that comprises (i) first training data with a sample label, and (ii) second training data without the sample label, wherein jointly training the first model comprises:
      privately obtaining the first training data of the second device; and
      performing joint model training using the first training data of the first device and the first training data of the second device, to obtain the first model;
   inputting the second training data of the first device to the trained first model to obtain a predicted label for the second training data of the first device; and
   jointly training a second model, by the first device and with the second device, wherein jointly training the second model comprises:
      privately obtaining labeled training data of the second device; and
      performing joint model training using (i) the first training data of the first device, (ii) the second training data of the first device for which the predicted label has been obtained using the first model, and (iii) the labeled training data of the second device, to obtain the second model.

2. The computer-implemented method of claim 1, further comprising iteratively training the second model, wherein each round of iteration comprises:
   updating the predicted label based on the second model having been obtained during a previous round of iteration;
   performing joint model training with the second device to update the second model; and
   based on the updated second model, determining to perform a next round of iteration, or determining the second model.

3. The computer-implemented method of claim 2, wherein the second model comprises a first parameter matrix and a second parameter matrix, the first parameter matrix and the second parameter matrix are stored by the first device and the second device respectively, and iteratively training the second model further comprises:
   obtaining a first encrypted accumulated value and a second encrypted accumulated value based on the first parameter matrix and the second parameter matrix, wherein the first encrypted accumulated value and the second encrypted accumulated value are stored by the first device and the second device respectively;
   calculating a first encrypted gradient matrix based on the first encrypted accumulated value; and
   updating the first parameter matrix based on the first encrypted gradient matrix.

4. The computer-implemented method of claim 3, wherein calculating the first encrypted gradient matrix based on the first encrypted accumulated value further comprises:
   receiving the second encrypted accumulated value from the second device; and
   calculating the first encrypted gradient matrix based on the first encrypted accumulated value, the second encrypted accumulated value, and the training data held by the first device.

5. The computer-implemented method of claim 3, wherein updating the first parameter matrix based on the first encrypted gradient matrix further comprises:
   sending the first encrypted gradient matrix to the second device for decryption to obtain a decrypted first gradient matrix; and
   updating the first parameter matrix based on the decrypted first gradient matrix.

6. The computer-implemented method of claim 3, wherein calculating the first encrypted gradient matrix based on the first encrypted accumulated value further comprises:
   splitting the predicted label and the sample label into a first label and a second label based on a secret sharing method, wherein the first label and the second label are stored by the first device and the second device respectively;
   calculating a first error value based on the first label and the first encrypted accumulated value;
   calculating a first portion of the first encrypted gradient matrix based on the first error value and the training data held by the first device;
   performing security matrix multiplication on the training data held by the first device and a second error value of the second device to obtain a first fragment of a second portion of the first encrypted gradient matrix, and obtaining a second fragment of the second portion of the first encrypted gradient matrix from the second device; and
   calculating the first encrypted gradient matrix based on the first portion of the first encrypted gradient matrix, the first fragment of the second portion of the first encrypted gradient matrix and a second fragment of a second portion of a second encrypted gradient held by the second device.

7. The computer-implemented method of claim 1, wherein the second model comprises a linear regression model.

8. A non-transitory, computer-readable medium storing one or more instructions executable by a computer system to perform operations comprising:
   jointly training a first model, by a first device and with a second device, wherein the first device and the second device each hold respective training data that comprises (i) first training data with a sample label, and (ii) second training data without the sample label, wherein jointly training the first model comprises:
  privately obtaining the first training data of the second device; and
  performing joint model training using the first training data of the first device and the first training data of the second device, to obtain the first model;
inputting the second training data of the first device to the trained first model to obtain a predicted label for the second training data of the first device; and
jointly training a second model, by the first device and with the second device, wherein jointly training the second model comprises:
  privately obtaining labeled training data of the second device; and
  performing joint model training using (i) the first training data of the first device, (ii) the second training data of the first device for which the predicted label has been obtained using the first model, and (iii) the labeled training data of the second device, to obtain the second model.

9. The computer-readable medium of claim 8, the operations further comprising iteratively training the second model, wherein each round of iteration comprises:
  updating the predicted label based on the second model having been obtained during a previous round of iteration;
  performing joint model training with the second device to update the second model; and
  based on the updated second model, determining to perform a next round of iteration, or determining the second model.

10. The computer-readable medium of claim 9, wherein the second model comprises a first parameter matrix and a second parameter matrix, the first parameter matrix and the second parameter matrix are stored by the first device and the second device respectively, and iteratively training the second model further comprises:
  obtaining a first encrypted accumulated value and a second encrypted accumulated value based on the first parameter matrix and the second parameter matrix, wherein the first encrypted accumulated value and the second encrypted accumulated value are stored by the first device and the second device respectively;
  calculating a first encrypted gradient matrix based on the first encrypted accumulated value; and
  updating the first parameter matrix based on the first encrypted gradient matrix.

11. The computer-readable medium of claim 10, wherein calculating the first encrypted gradient matrix based on the first encrypted accumulated value further comprises:
  receiving the second encrypted accumulated value from the second device; and
  calculating the first encrypted gradient matrix based on the first encrypted accumulated value, the second encrypted accumulated value, and the training data held by the first device.

12. The computer-readable medium of claim 10, wherein updating the first parameter matrix based on the first encrypted gradient matrix further comprises:
  sending the first encrypted gradient matrix to the second device for decryption to obtain a decrypted first gradient matrix; and
  updating the first parameter matrix based on the decrypted first gradient matrix.

13. The computer-readable medium of claim 10, wherein calculating the first encrypted gradient matrix based on the first encrypted accumulated value further comprises:
  splitting the predicted label and the sample label into a first label and a second label based on a secret sharing method, wherein the first label and the second label are stored by the first device and the second device respectively;
  calculating a first error value based on the first label and the first encrypted accumulated value;
  calculating a first portion of the first encrypted gradient matrix based on the first error value and the training data held by the first device;
  performing security matrix multiplication on the training data held by the first device and a second error value of the second device to obtain a first fragment of a second portion of the first encrypted gradient matrix, and obtaining a second fragment of the second portion of the first encrypted gradient matrix from the second device; and
  calculating the first encrypted gradient matrix based on the first portion of the first encrypted gradient matrix, the first fragment of the second portion of the first encrypted gradient matrix and a second fragment of a second portion of a second encrypted gradient held by the second device.

14. The computer-readable medium of claim 8, wherein the second model comprises a linear regression model.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    jointly training a first model, by a first device and with a second device, wherein the first device and the second device each hold respective training data that comprises (i) first training data with a sample label, and (ii) second training data without the sample label, wherein jointly training the first model comprises:
      privately obtaining the first training data of the second device; and
      performing joint model training using the first training data of the first device and the first training data of the second device, to obtain the first model;
    inputting the second training data of the first device to the trained first model to obtain a predicted label for the second training data of the first device; and
    jointly training a second model, by the first device and with the second device, wherein jointly training the second model comprises:
      privately obtaining labeled training data of the second device; and
      performing joint model training using (i) the first training data of the first device, (ii) the second training data of the first device for which the predicted label has been obtained using the first model, and (iii) the labeled training data of the second device, to obtain the second model.

16. The computer-implemented system of claim 15, the operations further comprising iteratively training the second model, wherein each round of iteration comprises:

updating the predicted label based on the second model having been obtained during a previous round of iteration;

performing joint model training with the second device to update the second model; and based on the updated second model, determining to perform a next round of iteration, or determining the second model.

17. The computer-implemented system of claim 16, wherein the second model comprises a first parameter matrix and a second parameter matrix, the first parameter matrix and the second parameter matrix are stored by the first device and the second device respectively, and iteratively training the second model further comprises:

obtaining a first encrypted accumulated value and a second encrypted accumulated value based on the first parameter matrix and the second parameter matrix, wherein the first encrypted accumulated value and the second encrypted accumulated value are stored by the first device and the second device respectively;

calculating a first encrypted gradient matrix based on the first encrypted accumulated value; and updating the first parameter matrix based on the first encrypted gradient matrix.

18. The computer-implemented system of claim 17, wherein calculating the first encrypted gradient matrix based on the first encrypted accumulated value further comprises:

receiving the second encrypted accumulated value from the second device; and calculating the first encrypted gradient matrix based on the first encrypted accumulated value, the second encrypted accumulated value, and the training data held by the first device.

19. The computer-implemented system of claim 17, wherein updating the first parameter matrix based on the first encrypted gradient matrix further comprises:

sending the first encrypted gradient matrix to the second device for decryption to obtain a decrypted first gradient matrix; and updating the first parameter matrix based on the decrypted first gradient matrix.

20. The computer-implemented system of claim 17, wherein calculating the first encrypted gradient matrix based on the first encrypted accumulated value further comprises:

splitting the predicted label and the sample label into a first label and a second label based on a secret sharing method, wherein the first label and the second label are stored by the first device and the second device respectively;

calculating a first error value based on the first label and the first encrypted accumulated value;

calculating a first portion of the first encrypted gradient matrix based on the first error value and the training data held by the first device;

performing security matrix multiplication on the training data held by the first device and a second error value of the second device to obtain a first fragment of a second portion of the first encrypted gradient matrix, and obtaining a second fragment of the second portion of the first encrypted gradient matrix from the second device; and calculating the first encrypted gradient matrix based on the first portion of the first encrypted gradient matrix, the first fragment of the second portion of the first encrypted gradient matrix and a second fragment of a second portion of a second encrypted gradient held by the second device.

\* \* \* \* \*